United States Patent Office 3,226,276
Patented Dec. 28, 1965

3,226,276
METHOD OF BONDING CORD TO RUBBER WITH A PHENOL-ALDEHYDE BLOCKED POLYISO-CYANATE
Grover W. Rye, Cuyahoga Falls, Arnold H. Bridge, Mogadore, and Fred J. Kovac, Akron, Ohio, assignors to The Goodyear Tire & Rubber Company, Akron, Ohio, a corporation of Ohio
No Drawing. Filed May 1, 1962, Ser. No. 191,423
4 Claims. (Cl. 156—335)

This invention relates to an improved method of bonding a reinforcing element to rubber which comprises treating the reinforcing element with a phenolic/aldehyde deficient resin and embedding the treated element in a rubber containing resin-forming components reactive upon the application of heat to form a resinous bond between the rubber and the element at the interface thereof and the product produced thereby.

In the manufacture of such reinforced rubber articles as pneumatic tires, power-drive belts, conveyor belts, high-pressure hose and the like, the useful life of these articles depends to a great extent upon the bond secured between the reinforcing element or cord and the rubber. The chemistry and physical properties of the cord and the rubber being reinforced determines to a large extent the degree of adhesion and life of the bond developed at the interface of these different materials.

In all of these situations where a rubber is being reinforced with a cord, a sharp difference in the modulus of the materials used exists. For example, the modulus at break for rubber may range from about 500 p.s.i. to about 4,000 p.s.i., whereas the modulus at break for a reinforcing cord may range from about 50,000 p.s.i. to 500,000 p.s.i. This large difference between the moduli of these materials being bonded together develops severe shear forces at the interface when the structure is under stress.

Many different reinforcing cords are used to reinforce rubber, including those made from a regenerated cellulosic material such as rayon, a polyamide such as a nylon, a polyester such as Dacron a high molecular weight polyethylene terephthalate, a metal such as steel, etc.

In like manner, many different types of rubbers are employed, including natural rubber, and synthetic rubbers which include vulcanizable polymers of a conjugated diene including butadiene; isoprene; 2-methyl-pentadiene-1,3; 2-methyl-pentadiene-2,4; piperilene; and other unsaturated hydrocarbons, esters, alcohols, acids, ethers, etc. The rubbery copolymers generally contain a major proportion of conjugated diene except for butyl rubber, which is a copolymer containing a major proportion of isobutylene with a minor amount of butadiene. Specific commercial synthetic rubbers include copolymers of a major amount of butadiene and a minor amount of styrene and generally known as SBR rubbers; copolymers of a major amount of butadiene and a minor amount of acrylonitrile, known as NBR rubbers; and stereorubbers such as cis-1,4 polyisoprene and cis-1,4 polybutadiene.

In the present invention, it has been discovered that a vastly improved bond is developed when the modulus of the cord and the rubber is brought closer together and, most surprisingly, it has been discovered that even a small percentage change of moduli of these materials toward each other results in a greatly improved bond between these materials and improved performance of the article, for example, a pneumatic tire, by virtue of a reduction in the resultant shear forces at the cord/rubber interface.

The method of the present invention not only develops an improved bond between the reinforcing cord and the rubber, but improves other properties of the cord such as flexibility and improves other properties of the rubber such as abrasion resistance when brought into reinforcing relationship with each other that heretofore has not been realized.

It is known that a cord may be treated with a resorcinol/formaldehyde resin and subsequently treated with an aldehyde-producing agent such as paraformaldehyde, but when the cord is subjected to present-day conditions of high temperature during its treatment prior to embedment in rubber, the aldehyde-producing agent is triggered and crosslinking of the phenolic resin is accomplished before the cord has been assembled with the rubber. In addition, the crosslinking of the resin in the cord produces a stiffness in the cord which is detrimental to the fatigue life of the cord in use, such as experienced in a pneumatic tire during high and sustained speeds as is encountered in turnpike travel.

These problems have been eliminated in the use of the present invention which involves first treating the reinforcing cords with a phenolic/aldehyde deficient type resin, which is then treated in a conventional manner under high temperature conditions to remove water and cause the resin to be further reacted at the cord surface in accordance with its nature to form a flexible heat-reactive resin without interfering with the flexibility of the cord, even though the resin has penetrated into the body thereof. The treated cord is then embedded in the rubber being reinforced after the rubber has been treated with phenolic resin-forming components. These components may be present in various amounts and in various ratios. Generally 1 to 15 parts or more of the resin-forming components per 100 parts of rubber may be mixed into the rubber to be calendered onto the textile material. The cross-linking agent such as the aldehyde may be present in a molar ratio to phenolic component ranging from .5 to 1.2. The resin-forming components may be precondensed to form a heat-reactive resin which upon application of heat, as during cure, will form a resisn matrix at the cord/rubber interface with the heat-reactive resin on the cord. It has been discovered that the presence of the phenolic resin-forming components in the rubber form a reinforcing matrix in the rubber and at the same time combine with the phenolic/aldehyde deficient resin on the cord to form a bond across the cord/rubber interface, which is far superior to those produced when the rubber stock is not treated in the manner disclosed here.

Any resinous composition which is capable of being further activated by means of a crosslinking agent to form an insoluble thermoset mass, but which otherwise is soluble in normal solvents and flexible, may be used as the principal adhesive component on the cord. The preferred type of resinous composition is that type made by reacting an aldehyde with a resin-forming component, such as urea, or a phenol, preferably a polyhydric phenol such as resorcinol, and of particular desirability are the phenolic resins that are substantially soluble in water and formed in the presence of a molar deficiency of aldehyde. In the present invention, the phenolic/aldehyde deficient resin used in treating the cord is made by reacting the polyhydric phenol, such as resorcinol, with a deficient amount of an aldehyde such as formaldehyde. Suitable aldehydes that may be used, in addition to the preferred aldehyde formaldehyde, are acrolein, glyoxal, furfural, crotonaldehyde, aldol, hexamethoxymethylmelamine, and benzylaldehyde. Suitable phenols that may be reacted with a molar deficient amount of one of the aforementioned aldehydes include, in addition to the polyhydric phenol, resorcinol, other difunctional compounds such as cresol, catechol, phloroglucinol, saligenin, dibeta naphthol, xylenol, 4,6-dimethyl-resorcinol, 2,5-dimethyl-resorcinol, hydroquinone, furfural alcohol, orcinol, pyrogallol, beta-naphthol, aminophenol, guaiacol, as well as urea and melamine.

In making the aldehyde type polyfunctional resin, it is desirable to have an excess of the polyfunctional component, such as resorcinol, present during the reaction with the aldehyde. Under these conditions, a resin is produced which is soluble in water and found reactive in the presence of additional aldehyde and thus chemically reactive as an adhesive component in bonding a cord to rubber, and particularly when used in combination with an R/F/L adhesive, i.e., a resorcinol/formaldehyde/rubber latex mixture.

A particularly desirable aldehyde type polyfunctional type resin that is useful in the present invention in the treatment of any cord normally used to reinforce rubber is one made by reacting the resorcinol with formaldehyde in ratios of resorcinol to formaldehyde ranging from 1.0/0.25 to 1.0/0.99. In making this particular resorcinol/formaldehyde resin, it is required that a molar ratio of formaldehyde to resorcinol of less than about 1.0 be used and preferably a ratio of between about 0.5 and about 0.75. The reaction of the resorcinol and the formaldehyde may be carried out either in a neutral medium or a medium made basic with, for example, sodium hydroxide, or made acidic with, for example, oxalic acid. It is preferred to use a resorcinol/formaldehyde resin made from reacting about 1.0 part of resorcinol with about 0.7 part of formaldehyde.

Other resins that may be used include the water-soluble resin-blocked polyisocyanates made by reacting a polyisocyanate with a water-soluble phenolic/aldehyde resin. These resin-blocked polyisocyanates may be used alone or in combination with the phenolic/aldehyde deficient resins described above. When used alone, it is preferred that the resin blocking component be made with a deficiency of aldehyde. Any polyisocyanate may be reacted with a water-soluble aldehyde/phenolic type of resin to form a temporary blocking of the polyisocyanate reactivity with a water at temperatures at least below 212° F., and also insure the production of a resin that is chemically reactive as an adhesive component in bonding a cord to rubber and particularly in combination with an R/F/L adhesive containing a rubber latex, when the blocked polyisocyanate is heated to regenerate the polyisocyanate and the phenolic resin. Any of the well-known polyisocyanates may be used in making the resin-blocked polyisocyanate, including triphenyl methane-triisocyanate, 2,4-tolylene-diisocyanate, hexamethylene-diisocyanate, etc. A particularly desirable aldehyde type of blocking agent useful in temporarily blocking the polyisocyanate is one made by reacting resorcinol with formaldehyde in ratios of resorcinol to formaldehyde of 1.0/0.25 to 1.0/1.0. It is preferred to use a deficient amount of formaldehyde in making the phenol/aldehyde blocking resin and preferably between 0.5 and 0.75 mol of aldehyde per mol of phenol.

The following example is a control showing results obtained in the manufacture of a 2-ply pneumatic tire, the cords of which are bonded to rubber ply stock with a conventional adhesive of the type indicated. All parts are by weight unless otherwise indicated.

EXAMPLE 1.—NYLON CONTROL

A conventional tubeless pneumatic tire comprising an open-bellied, hollow annular body, terminating in spaced-apart bead portions and as described in United States Patent 2,987,094 was made with plies of nylon cord 840/2 bonded to rubber with a conventional R/F/L adhesive containing 20% solids made in accordance with the following formula:

*R/F/L adhesive*

| Ingredients: | Parts (by weight) |
|---|---|
| Resorcinol | 1.68 |
| Formaldehyde (37%) | 2.16 |
| Sodium hydroxide (10%) | 2.04 |
| Terpolymer rubber latex of styrene/butadiene-1,3/vinylpyridine 15/70/15 (41%) | 12.90 |
| Copolymer rubber latex of styrene/butadiene-1,3 (39%) | 25.20 |
| Water | 56.02 |

The nylon cord 840/2 was treated with the adhesive composition described above by passing the cord through the adhesive at such a rate as to deposit on the surface of the cord between about 5% to about 10% adhesive solids. This may be achieved by passing the cord through the adhesive composition at the rate of between 5 feet to about 10 feet per minute and then drying the adhesive on the cord at a temperature of 350° F. for 2 minutes followed by a second heat treatment at 425° F. for 40 seconds.

The treated cord was then embedded in a rubber stock compounded as follows:

*Rubber stock*

| Ingredients: | Parts (by weight) |
|---|---|
| Natural rubber | 100.00 |
| Zinc oxide | 3.00 |
| Carbon black | 29.80 |
| Stearic acid | 2.00 |
| Pine tar | 7.00 |
| Mercaptobenzothiazole | 1.25 |
| Sulfur | 3.00 |
| Diphenylguanidine | 0.15 |
| Phenyl beta naphthylamine | 1.00 |

Adhesion between the cord and rubber was measured on a ¼" "U" sample at 250° F. after an 8-minute cure of the rubber stock at 310° F. and found to develop a pull of 24#. The ¼" "U" sample is made by embedding the cord in the form of a loop with the ends embedded in rubber stock ¼" wide, and then attempting to remove the cord from the rubber by pulling on the looped end of the cord, thereby attempting to remove two legs of the cord from the rubber.

A heat durability test was made by forming a tube of rubber reinforced with the cord treated in the manner above-described in accordance with the tube fatigue test ASTM D-885-59T, Section 42. A value of 425 KC was obtained.

A conventional tubeless pneumatic tire built as described above was run against a cleated wheel while inflated to 26# pressure at 45 m.p.h. and found to have endured for 4,298 miles before ply separation occurred.

The following example is a control using a polyester type cord reinforcing element, but treated with a preferred adhesive system found effective with regard to polyester fibers.

EXAMPLE 2.—POLYESTER CONTROL

An R/F/L adhesive composition was made in accordance with the following formula:

| Ingredients: | Parts |
|---|---|
| Resorcinol | 98 |
| Formaldehyde (37%) | 53 |
| Terpolymer rubber latex of styrene/butadiene-1,3/vinylpyridine 15/70/15 (41%) | 1152 |
| Water | 543 |

The R/F/L adhesive composition was prepared by adding 98 parts of the resorcinol to 196 parts of water, followed by the addition of 53 parts of formaldehyde. The resulting mixture was aged for 1 hour and then 1152 parts of terpolymer rubber latex was added. The resulting mixture was aged for a period of 72 hours. After aging, the balance of the water was added. To 65 parts of this R/F/L composition was added 35 parts of a resinous composition made in accordance with the following formula:

110 parts of resorcinol, 25 parts by volume of formalin (37% formaldehyde in methanol and water), and 20 parts by volume of water was reacted together in a reaction vessel equipped with both heating and cooling coils, a reflux condenser and a suitable agitator. The mixture was heated to reflux temperature (100° C.) and allowed to remain at this temperature for 15 minutes, after which an additional 30 parts by volume of formalin was added to the reaction mixture over a period of 10 minutes. After being refluxed for an additional 30 minutes, the resin formed in the reaction vessel was allowed to cool to room temperature. A thick, syrupy resin (for convenience referred to as Resin A) containing 60% solids, a viscosity of 750 cps. and a pH of 7 was obtained.

20 parts of the Resin A described above is reacted with 6 parts of polymethylene polyphenylisocyanate for 48 hours at 72° F. At the end of this time, the resulting reaction mixture is treated with 0.1 part of sodium hydroxide and 100 parts of water. The resulting neutralized resin-blocked polyisocyanate was allowed to age for 8 hours to produce a clear supernatant layer of soluble resin-blocked polyisocyanate (and for convenience to be referred to as Resin B).

To 65 parts of the R/F/L adhesive composition described in Example 2 above is added 35 parts of Resin B and allowed to age at 72° F. for 4 hours.

A reinforcing element comprising a polyester cord 1100/2 (Dacron) was treated with the adhesive composition described here in the manner described above in Example 1 and found to produce a ¼" hot "U" adhesion of 24# and a heat durability of 350 KC.

A conventional tubeless pneumatic tire made in the manner described above, but using the adhesive described here and tested in the manner described above was run 4,792 miles before ply separation was detectable.

The following example shows the exceptional improvement when bonding a polyester cord to rubber using the process of the present invention.

EXAMPLE 3

A polyester cord of the type described in Example 2 was imbedded in the rubber composition disclosed in Example 1, modified to the extent that 3 parts of hexamethylene tetramine and 4 parts of resorcinol was milled into the rubber stock along with the other ingredients. The stock was then cured at 310° F. and found to develop a hot "U" adhesion of 30# and a heat durability fatigue of 695 KC. A pneumatic tire built in the manner described above and tested as described above ran for 7,959 miles before ply separation occurred.

The exceptional adhesion developed between the rubber stock and a polyester cord using the adhesive system of this invention may be more fully appreciated as being an unexpected phenomenon in bonding a cord to rubber when it is observed that the same high adhesive values are obtained when substituting nylon for polyester in Example 3 above, to get hot "U" adhesions of 30# and a fatigue of 575 KC and 6,850 miles before ply separation was detectable when compared to the values set forth in Example 1 above. It was also observed that acceptable adhesions were obtained when the untreated polyester cord described in Example 2 was embedded in the rubber stock described in Example 3.

While certain representative embodiments and details have been shown for the purpose of illustrating the invention, it will be apparent to those skilled in this art that various changes and modifications may be made therein without departing from the spirit or scope of the invention.

What is claimed is:
1. A method of forming a laminate of
a rubber selected from at least one of the group consisting of
natural rubber, and
a sulfur-vulcanizable synthetic rubbery diene polymer, and
a reinforcing cord made from materials selected from the group consisting of
regenerated cellulose,
a polyamide and
a polyester which comprises forming a layer of a resin on said cord by heating at a temperature above about 350° F.,
a mixture on said cord of a phenolic/aldehydic deficient resin reaction product of a polyisocyanate,
the aldehydic component being present in an amount of from 0.25 to less than 1.0 mole per mole of phenolic component,
a rubber latex
a phenol and
an aldehyde
the phenol being present in said mixture in excess of the amount needed to react completely with the aldehyde,
adding a mixture of
a phenol and
an aldehyde to said rubber
the aldehyde being present in the rubber in an amount sufficient to react with the phenol to form a resin in said rubber and to react with said resin layer on said cord,
embedding the resin-coated-cord in said rubber and
heating said rubber to cause vulcanization thereof and the formation of a resin in said rubber and the reaction of said aldehyde in said rubber with said resin on said cord to thereby secure said resin on said cord to said resin in said rubber.

2. A method of forming a laminate of
a rubber selected from at least one of the group consisting of
natural rubber, and
a sulfur-vulcanizable synthetic rubbery diene polymer, and
a reinforcing cord made of a high molecular weight polyethylene terephthalate which comprises forming
a layer of a resin on said cord by heating at a temperature above about 350° F.,
a mixture on said cord of
a phenolic/aldehydic deficient resin blocked polyisocyanate,
the aldehydic component being present in an amount of from 0.5 to .75 mole per mole of phenolic component,
a rubber latex,
resorcinol and
formaldehyde,
the resorcinol being present in said mixture in excess of the amount needed to react completely with said formaldehyde,
adding a mixture of resorcinol and formaldehyde to said rubber,
the formaldehyde being present in the rubber in an amount sufficient to react with the resorcinol to form a resin in said rubber and to react with said resin on said cord,
embedding said resin-coated-cord in said rubber and,
heating said rubber to cause vulcanization thereof and the formation of a resin in said rubber and the reaction of said formaldehyde in said rubber with said resin on said cord to thereby secure said resin on said cord to said resin in said rubber.

3. The method of claim 2 wherein the polyisocyanate is polymethylene polyphenylisocyanate and the rubber latex is of the nature of the rubber being bonded to said cord.

4. The method of claim 2 wherein the aldehydic component of the resin used for reaction with the polyisocyanate is present in an amount from 0.25 to less than 1.0 mole per mole of phenolic component.

(References on following page)

References Cited by the Examiner

UNITED STATES PATENTS

| | | | |
|---|---|---|---|
| 2,314,998 | 3/1943 | Lessig et al. | 156—335 |
| 2,349,756 | 5/1944 | Pratt | 260—70 |
| 2,414,414 | 1/1947 | Rhodes | 156—335 |
| 2,414,415 | 1/1947 | Rhodes | 156—335 |
| 2,557,826 | 6/1951 | Keaton et al. | 156—335 XR |
| 2,639,258 | 5/1953 | Evans et al. | 156—335 XR |
| 2,653,891 | 9/1953 | Gentle et al. | 156—335 XR |
| 2,746,898 | 5/1956 | Buckwalter et al. | 156—335 XR |
| 2,748,049 | 5/1956 | Kalafus | 156—335 XR |
| 2,993,825 | 7/1961 | Gage | 154—52 XR |

MURRAY TILLMAN, *Primary Examiner.*

EARL M. BERGERT, *Examiner.*